United States Patent
Callewaert et al.

(10) Patent No.: US 12,373,302 B1
(45) Date of Patent: Jul. 29, 2025

(54) SPACE-SAVING CYBER PROTECTION AUTOMATION

(71) Applicant: Dell Products, L.P., Hopkinton, MA (US)

(72) Inventors: Peter Callewaert, Eernegem (BE); Dennis J. Trulli, Jr., Hudson, MA (US); Brett Quinn, Cotuit, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/632,514

(22) Filed: Apr. 11, 2024

(51) Int. Cl.
G06F 11/14 (2006.01)
(52) U.S. Cl.
CPC ...... *G06F 11/1451* (2013.01); *G06F 11/1464* (2013.01)
(58) Field of Classification Search
CPC ............ G06F 11/1451; G06F 11/1464
USPC ........................................ 714/6.3
See application file for complete search history.

(56) References Cited

U.S. PATENT DOCUMENTS

2023/0032714 A1* 2/2023 Pandit ............... G06F 11/1453

* cited by examiner

Primary Examiner — Yair Leibovich
(74) Attorney, Agent, or Firm — Anderson Gorecki LLP (57) ABSTRACT

Storage volumes of a remote data forwarding group are mirrored on a leg of a data replication facility from a production site in a primary region of the data replication facility to a cyber vault using asynchronous remote data forwarding. A multi-site consistency application is used to bring and maintain the data of the storage volumes on the cyber vault into a consistent state. Once the storage volumes in the cyber vault have achieved a consistent state, a snapset including a snapshot of each of the storage volumes is created from the storage volumes contained in the cyber vault on a determined rhythm. The snapset is optionally linked to a set of target devices at the cyber vault. If the production site is not in the primary region, the absence of consistency of the data at the cyber vault halts creation of snapsets at the cyber vault.

20 Claims, 8 Drawing Sheets

SPACE-SAVING CYBER PROTECTION AUTOMATION

FIELD

This disclosure relates to computing systems and related devices and methods, and, more particularly, to space-saving cyber protection automation.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, orchestrated disaster recovery cyber protection automation operates to ensure creation of snapsets of storage volumes in a cyber vault without initially creating snapsets of the storage volumes on the production system. By enabling the creation of snapsets of the storage volumes in the cyber vault, without requiring initial creation of the snapsets on the production system, it is possible to provide cyber protection for the storage volumes while consuming less storage resources on the production system. According to some embodiments, storage volumes of a remote data forwarding group are mirrored on a leg of a data replication facility to a cyber vault using asynchronous remote data forwarding. A multi-site consistency application is used to bring and maintain the data of the storage volumes on the cyber vault in a consistent restartable state. Using a Storage Volume Creation and Management System (SVCMS), a snapshot is created from each of the storage volumes contained in the cyber vault on a rhythm determined by the SVCMS. The snapset is optionally linked to a set of target devices at the cyber vault.

In some embodiments, a method of automated orchestration of cyber protection for a set of storage volumes, includes defining a remote data forwarding group on a first production site, the remote data forwarding group including the set of storage volumes, creating a data replication facility including the first production site and a first cyber vault, the data replication facility using asynchronous remote data forwarding to mirror data of the set of storage volumes from the first production site to the first cyber vault, and using a multi-site consistency application to achieve a consistent state of data on a set of storage volumes at the first cyber vault. In response to the determined consistent state of the data, creating a snapset of the storage volumes in the first cyber vault without first creating a corresponding snapset of the storage volumes on the first production site.

In some embodiments, the data replication facility further includes a second production site, the data replication facility using asynchronous remote data forwarding to mirror data of the set of storage volumes from the first production site to second production site. In some embodiments, the first production site is in a primary region of the data replication facility and the second production site is in a non-primary region of the data replication facility. In some embodiments, the method further includes performing a region swap, in which the first production site is in the non-primary region of the data replication facility and the second production site is in the primary region of the data replication facility. In some embodiments, in response to the region swap, the method further includes changing the data replication facility to use adaptive copy-disk remote data forwarding to mirror data of the set of storage volumes from the first production site to the first cyber vault.

In some embodiments, the data replication facility further includes a second cyber vault, the data replication facility using adaptive copy-disk remote data forwarding to mirror data of the set of storage volumes from the second production site to the second cyber vault. In some embodiments, the first production site is in a primary region of the data replication facility and the second production site is in a non-primary region of the data replication facility, and the method further includes performing a region swap, in which the first production site is in the non-primary region of the data replication facility and the second production site is in the primary region of the data replication facility. In some embodiments, in response to the region swap, the method includes changing the data replication facility to use adaptive copy-disk remote data forwarding to mirror data of the set of storage volumes from the first production site to the first cyber vault, and to use asynchronous remote data forwarding to mirror data of the set of storage volumes from the second production site to the second cyber vault.

In some embodiments, the method further includes using the multi-site consistency application to achieve a consistent state of data on the set of storage volumes at the second cyber vault, and in response to the determined consistent state of the data, creating a snapset of the storage volumes in the second cyber vault without first creating a corresponding snapset of the storage volumes on the second production site.

In some embodiments, the method further includes defining a versioned data group at the first cyber vault, the versioned data group including the set of storage volumes at the first cyber vault.

BRIEF DESCRIPTION OF THE DRAWINGS

In FIG. 7, data center DC2 is in the primary region and data center DC4 is in the non-primary region. FIG. 8 shows the same configuration as FIG. 7 after a region swap, in which data center DC4 is in the primary region and data center DC2 is in the non-primary region.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
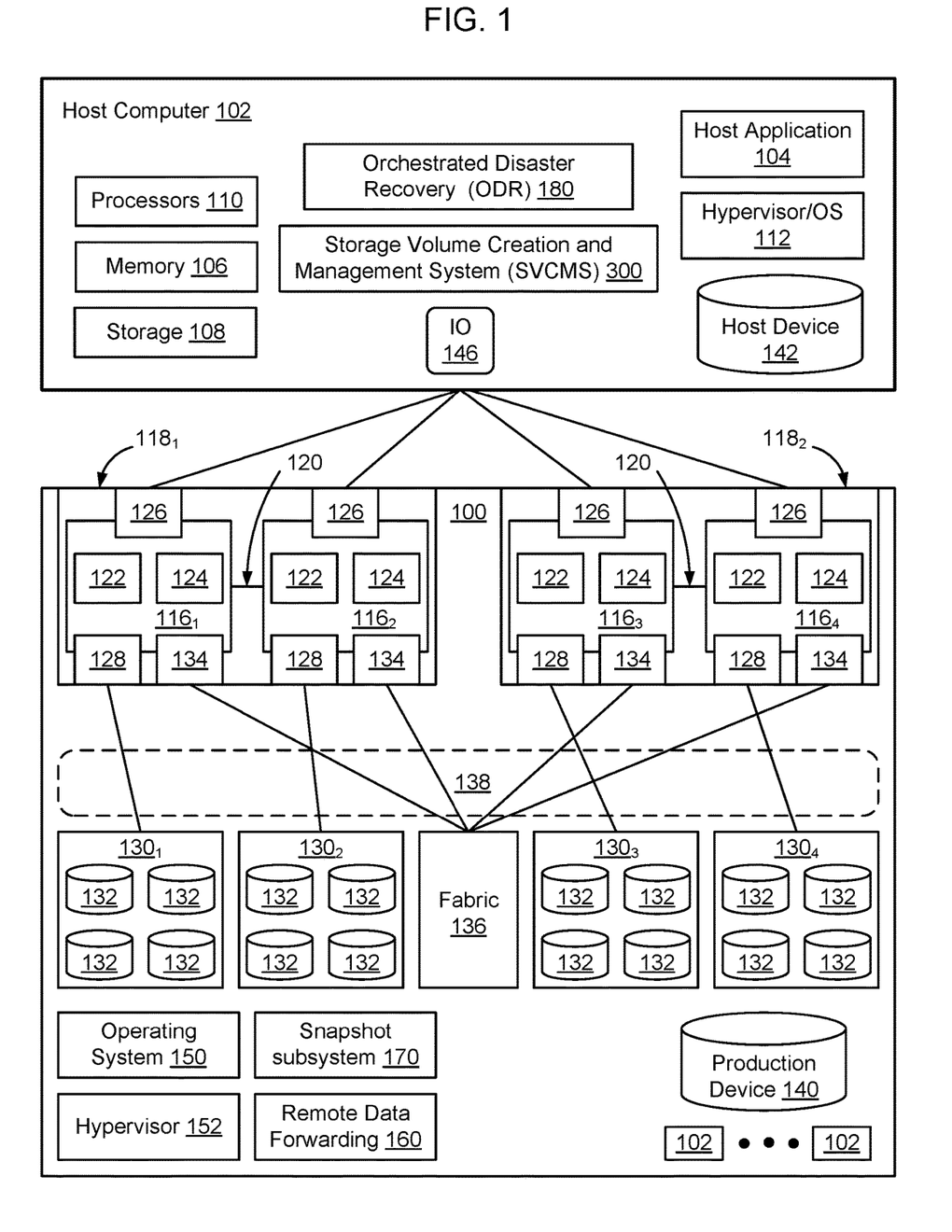
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access).

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. In some implementations, from the perspective of the host application 104, the host device 142 is a single data storage device having a set of contiguous fixed-size LBAs (Logical Block Addresses) on which data used by the host application 104 resides and can be stored. The data used by the host application 104 and the storage resources available for use by the host application 104 may actually be maintained by the compute nodes 116$_1$-116$_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host local volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes 116$_1$-116$_4$. In the case where the IO 146 is a write command, in some embodiments the storage system 100 copies a block being written into the virtual shared global memory 138, marks the data as dirty, and creates new metadata that maps the address of the data at the production device 140 to a location to which the block is written on the managed drives 132.

Hosts 102, such as mainframe (zOS) computer systems, store data using storage resources of the storage systems 100. Software, such as an Orchestrated Disaster Recovery (ODR) application 180 is used to automate, react, and monitor large scale mainframe and mixed mainframe-open systems environments, to provide continuous operations or automated failover during planned or unplanned events. One example commercially available ODR application 180 is referred to as Geographically Dispersed Disaster Recovery (GDDR) which is available from Dell™, although the techniques described herein can be used in connection with other forms of ODR applications 180. Although some embodiments will be described using GDDR as an example implementation of an ODR application 180, it should be understood that the techniques described herein for automated orchestration of cyber protection can be used in other environments as well.

In some embodiments, ODR application 180 is a mainframe software product that automates business recovery procedures by reacting to events that its monitoring capability detects in a data center. Because the ODR application 180 is designed to provide system restart following disasters, ODR application 180 does not reside in the same systems that it is seeking to protect. Rather, ODR application 180 resides on separate logical partitions from those that run application workloads.

In some embodiments, ODR application 180 works in connection with remote data forwarding subsystem 160 of storage system 100 to create replication facilities between pairs of similarly configured storage systems 100. Replication of data on a replication facility will be referred to herein as remote data forwarding (RDF). The set of storage systems configured to implement remote data forwarding is referred to herein as a data replication facility. As described in greater detail herein, in some embodiments one of the storage systems that is configured to implement cyber protection includes a snapshot subsystem configured to create point in time copies of storage volumes. A snapshot of a storage volume, such as production device 140, is point-in-time copy of the storage volume as the storage volume existed at the time that the snapshot was created.

In some embodiments, host computer runs a mainframe software application configured to manage creation and management of storage volumes and to interact with the storage systems 100 that are providing storage resources to the host computer 102 to ensure that the storage systems 100 are correctly configured to provide continuous data protection for mainframe data assets. For example, as shown in FIG. 1, in some embodiments the host computer includes Storage Volume Creation and Management System (SVCMS) 190 that is configured to interact with storage system 100 to cause the snapshot subsystem 170 of storage system 100 to create snapshots of storage volumes that are used by host computer 102 and are stored in the cyber vault on a regular cadence.

In some embodiments, SVCMS 190 interacts with the storage system 100 that is being used as the cyber vault to create a versioned data group of the storage volumes that are contained in the cyber vault that are to be backed up. SVCMS 190 also interacts with the snapshot subsystem 170 of the storage system 100 on the cyber vault CRy to cause the snapshot subsystem 170 to create snapsets (groups of snapshots) of the storage volumes of the versioned data group. In this way, the mainframe host 102 can control creation of snapsets of volumes of data by the snapshot subsystem 170 within the cyber vault, to create point in time recovery points of the set of storage volumes stored in the cyber vault.

In some embodiments, as shown in FIG. 1, one application that may be executing on storage system 100 is a Remote Data Forwarding (RDF) application process 160, which causes selected storage volumes to be mirrored by the storage system 100 to one or more similar backup storage systems 100.

It is possible for a primary storage system 100 (R1) to perform data replication to a backup storage system 100 (R2) where the storage systems 100 are compatible and properly configured. The RDF application 160, when executed on storage system 100, enables the storage system 100 to participate in storage system level data replication between sets of mirroring pairs of storage systems 100. A set of storage systems 100 that are configured for data to be mirrored from a primary storage system 100 (R1) to a backup storage system 100 (R2) will be referred to herein as a "data replication facility". A given storage system, such as storage system 100, may operate as a primary storage system R1 or as a backup storage system R2 in many mirroring pairs, and hence multiple RDF applications 160 may simultaneously execute on storage system 100 to control participation of the storage system 100 in the mirroring operations.

Data transfer among storage systems, including transfers between storage systems 100 for data replication (mirroring) functions, may take place in several ways depending on how the primary storage system R1 handles data written by the host 102 and how the backup storage system R2 acknowledges receipt of data on the data replication facility. Three example data mirroring modes will be referred to herein as synchronous (RDF/S), asynchronous (RDF/A), and Adaptive Copy Disk (ADCOPY-DISK).

In the synchronous data replication mode (RDF/S), data is transmitted from a primary storage system R1 to a backup storage system R2 as the data is received from a host 102, and an acknowledgement of a successful write is transmitted by the backup storage system R2 synchronously with the completion thereof. To maintain a synchronous relationship between the primary storage system R1 and the backup storage system R2, each IO from the host 102 is forwarded by the primary storage system R1 to the backup storage system R2 as it is received from host 102, and the primary storage system R1 will wait for an acknowledgment from the backup storage system R2 before issuing a subsequent IO from the host 102.

In the asynchronous data replication mode (RDF/A), when data is received from the host 102, the data is written to the primary storage system R1 and a data transfer process is initiated to write the data to the backup storage system R2 on the data replication facility. The primary storage system R1 acknowledges the write operation to the host 102 before the primary storage system R1 has received an acknowledgement that the data has been received by the backup storage system R2. The use of asynchronous data replication enables the data on the primary storage system R1 and backup storage system R2 to be one or more cycles out of synchronization, because the primary storage system R1 will continue to execute IOs prior to receipt of acknowledgments from the backup storage system R2. The use of asynchronous replication may be beneficial in connection with sites located geographically distant from each other, for example where the distance between the primary storage system R1 and the backup storage system R2 is such that waiting for an acknowledgement from the backup storage system R2 would take considerable time and, hence, reduce responsiveness of the primary storage system R1 to the data client 110.

Adaptive Copy Disk (ADCOPY-DISK) data replication mode, as that term is used herein, refers to an asynchronous type of data replication in which data is transmitted from the primary storage system R1 to the backup storage system R2 using a best-efforts type of data replication between the storage systems. In adaptive copy, the data on the backup storage system R2 may be more than one IO out of synchronization with the primary storage system R1 and, accordingly, data consistency at the backup storage system R2 is not guaranteed. Adaptive copy enables bulk copy operations to be implemented between the primary storage system R1 and the backup storage system R2, for example when there are many tracks to synchronize between the two storage systems.

Figure 2:
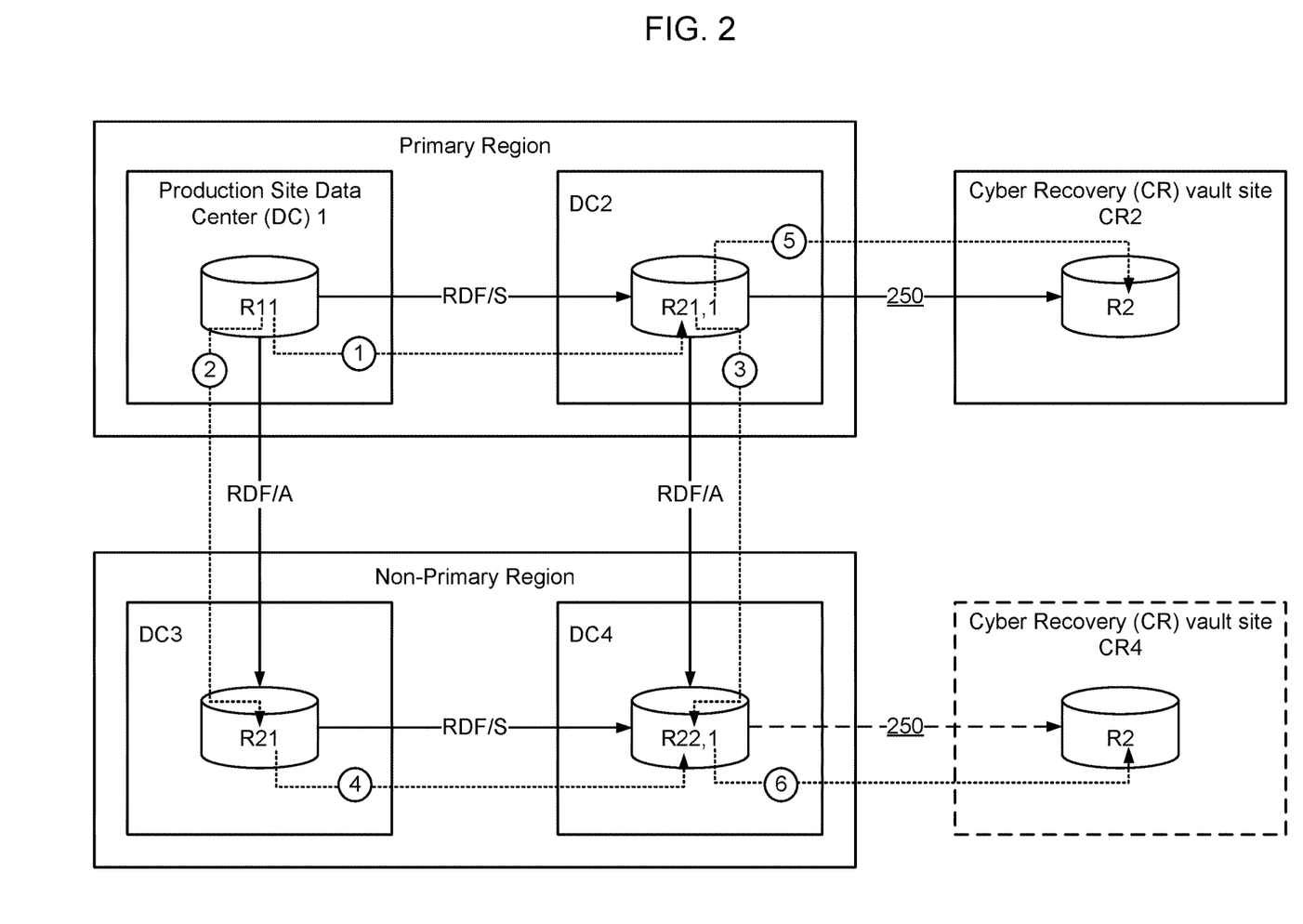
FIG. 2 is a block diagram of a storage environment including four Data Centers (DC) arranged in a square data replication facility, and including one or more Cyber Recovery (CR) vault sites, according to some embodiments.

There are many types of data replication facilities that may be created, which may have different topographies depending on the number of data centers and the manner in which data is configured to be replicated between the data centers. For example, FIG. 2 is a block diagram of a storage environment including four Data Centers (DC1, DC2, DC3, and DC4) that are arranged in a square data replication facility that also includes one or more Cyber Recovery (CR) vault sites, according to some embodiments. Although some embodiments are described herein in which the data replication facility is implemented using a square topography, it should be understood that other topographies may be used as well depending on the particular implementation.

In the nomenclature adopted in the figures, the letter "R" is used to refer to one or more storage volumes that has been included in a data replication facility, such that data that is written to one or more of the storage volumes will be replicated on the data replication facility (R). The numbers following the letter R indicate if the storage volume is a source (designated by a number 1) or a receiver (designated by the number 2). In FIG. 2, the square topography of the data replication facility includes a first pair of data centers, DC1 and DC2, in a primary region and a second pair of data centers, DC3 and DC4, in a non-primary region.

In the data replication facility shown in FIG. 2, production site data center DC1 is the source (R11) on both a first replication session to data center DC2 (Arrow 1) and on a second replication session to data center DC3 (Arrow 2). Synchronous replication is used to replicate data between the data centers in the primary region (on Arrow 1 from DC1 to DC2) and asynchronous data replication RDF/A is used to replicate data between the primary and non-primary regions (on Arrow 2 from DC1 to DC3). DC2 likewise replicates data received from DC1 in a cascaded manner to DC4 over an asynchronous data replication session (Arrow 3). Further, within the non-primary region, DC3 replicates data received from DC1 in a cascaded manner to DC4 (Arrow 4) using synchronous data replication. Hence, in FIG. 2, the square data replication facility includes four data replication sessions:

DC1→DC2 (Arrow 1: synchronous remote data forwarding RDF/S)
DC1→DC3 (Arrow 2: asynchronous remote data forwarding RDF/A)
DC2→DC4 (Arrow 3: asynchronous remote data forwarding RDF/A)
DC3→DC4 (Arrow 4: synchronous remote data forwarding RDF/S)

In some embodiments, orchestrated disaster recovery application 180 is used to configure the data replication facility to enable data to be mirrored between storage systems DC1, DC2, DC3, and DC4 so that, in the event of a failure of one of the storage systems, the data remains available on one or more of the other storage systems. It should be noted that the same set of storage volumes, that originate at DC1, are replicated on each of the replication sessions (arrows 1, 2, 3, and 4). In the event of a failure, the orchestrated disaster recovery application 180 enables failover from one storage system to another of the storage systems of the data replication facility. Although FIG. 2 shows a square-shaped data replication facility, it should be understood that data replication facilities can have different numbers of storage systems and different architectures depending on the implementation.

In FIG. 2, a Cyber Recovery (CR) vault site is connected by a replication facility (arrow 5) with one of the production sites DC2, which is the source of production data that is to be protected using the cyber recovery vault CR2. In FIG. 2, production site DC2 is connected by a replication data facility (arrow 5) to a cyber recovery vault CR2, although cyber recovery vault CR2 may be connected to any production site DCx. In some embodiments, Cyber Protection Automation (CPA) is implemented using Orchestrated Disaster Recovery application 180, to create copies of data at a cyber recovery vault (CRV) site CRy that can be used for cyber recovery, for example in instances where the data maintained by the storage systems implementing the data replication facility is corrupted in a malware attack. In some embodiments, the storage volume creation and management system (SVCMS) 300 is used to create regular snapsets at the cyber recovery vault CR2, which is a physically separate, possibly airgapped, cyber recovery vault CR2 using a Cyber Protection Automation (CPA) process. Likewise, in FIG. 2, production site DC4 is connected by a replication data facility (arrow 6) to a second cyber recovery vault CR4, although the second cyber recovery vault CR4 may be connected to any production site DCx.

An air gap, as that term is used herein, refers to the relative isolation of the storage system CR2 implementing the cyber vault CRy from the production site DCx. As shown in FIG. 2, in some embodiments the production site DCx and cyber vault CRy 205 are connected by RDF links 250. In an air gapped solution, these RDF links 250 are normally offline, making data flow impossible. When an air gap connection is enabled, that means that data flow is possible and the RDF links are online. When an air gap connection is disabled, that means data flow is not possible because the RDF links are offline. By using an air gap, it is possible to physically isolate the cyber vault CRy from the production sites of the data replication facility. In some embodiments, the cyber vault CRy controls the state of the air gap to selectively toggle the RDF links 250 between online and offline states.

U.S. Pat. No. 11,580,065, entitled Automated Orchestration of Cyber Protection of a Set of Storage Volumes, describes a process of protecting storage volumes by creation of snapsets of the storage volumes on the production sites DCx, linking the snapsets to a set of target devices, and then transmission of the data from the linked target devices to the cyber vault to enable the snapsets to be stored in the cyber vault CRy. The content of U.S. Pat. No. 11,580,065 is hereby incorporated herein by reference in its entirety. This previous solution required additional space for creation of the snapsets on the production system, and required additional processing associated with linking the snapsets to the target devices on the production system and transmission of the data from the target devices on the production system to the cyber vault.

According to some embodiments, a new space-saving implementation is provided which removes the space requirements at the source site by adding support for the creation of consistent snapsets directly in the cyber vault CRy, without first creating corresponding snapsets in the production site. Specifically, as described in greater detail herein, according to some embodiments a process is provided by which snapsets are created from R2 devices in the cyber vault CRy that are RDF targets of the source site production volumes. The snapsets created in the cyber vault CRy may optionally be linked to a set of target devices on the cyber vault CRy. By directly creating snapsets from the R2 devices in the cyber vault CRy, it is possible to avoid creating corresponding snapsets on the production sites, thus saving both storage space and processing resources on the production sites.

According to some embodiments, a new cyber protection automation implementation is provided by Cyber Protection Manager (CPM) 315 to exploit an RDF mirror on the production devices at the source site (e.g., in 2-site configurations), or in some embodiments it may exploit a third RDF mirror (e.g., in Star, Star-A, or SQAR). This mirror will have a special flag limiting its use to cyber protection. This new implementation allows for 2 modalities, MSC-based asynchronous RDF, and data drain, which is also referred to herein as adaptive copy-disk (ADCOPY-DISK). The Cyber Protection Manager (CPM) 315 will determine whether the MSC-based modality is supported based on the ODR configuration type, RDF replication state, and the role of the source site in the ODR production configuration.

As used herein, the term MSC is used to refer to Multi-Session Consistency. MSC is an application 305 that is used to ensure consistency between storage volumes across a remote data forwarding mirror. In the MSC-based modality, the RDF relationship between the source site DCx and the vault site CRy is asynchronous remote data forwarding (RDF/A) with MSC consistency. This allows consistent snapsets to be created by the snapshot subsystem 170 in the cyber vault CRy at a regular pace determined by the state of an airgap or a specified snapshot creation interval or schedule. In some embodiments, one of the characteristics of this MSC-based modality is that the creation of consistent snapsets in the cyber vault CRy no longer requires creation of corresponding snapsets at the source site, and hence the reduced space requirement. In the previous implementation, described in U.S. Pat. No. 11,580,065, the snapsets in the vault are replicas of snapsets at the source site. By enabling snapsets to be created directly in the cyber vault CRy, it is possible to alleviate the mechanics and time consumption associated with the creation and linking of source site snapsets, thus allowing for a higher frequency of snapset creation in the vault, giving the customer a finer granularity of recovery points in case of a cyber-attack.

In the data drain modality (ADCOPY-DISK), the RDF relationship between the source site and the vault site is adaptive copy disk and, in some embodiments, no snapsets are created in the cyber vault CRy. Specifically, when the mirroring relationship between DCx and CRy is ADCOPY-DISK, the volumes in the cyber vault CRy may be out of synchronization with the volumes on the production site DCx. In some embodiments, ADCOPY-DISK is used to keep the differential between the source DCx and the cyber vault site CRy as small as possible, and is used in situations where the MSC-based modality is not supported (i.e., when the source site is not in the primary region, the data is frozen, the data is not consistent, or the devices already have 2 active RDF/A mirrors). The goal of this data drain modality is to allow the MSC-based modality to restart faster when it becomes possible again.

According to some embodiments, since snapsets of storage volumes are not required to be created at the production site DCx to implement cyber protection at the cyber vault CRy, it is not necessary to create a versioned data group of storage volumes 320 at the production site DCx. Since snapsets 330 will be created at the cyber vault CRy, however, it is necessary to therefore define a versioned data group 325 at the cyber vault CRy. Optionally, a set of target devices 335 may also be defined in the cyber vault CRy, to allow the volumes 320 of the snapset 330 to be automatically linked to a set of target devices 335 in the cyber vault CRy.

In the MSC-based modality, the RDF groups on the DCx→CRy leg of the data replication facility will have RDF/A active in 2-site MSC mode. In some embodiments, if the cyber protection manager (CPM) 315 determines that the MSC-based modality is supported, Cyber Protection Manager (CPM) application 315 will manage the RDF/A (MSC) environment on the DCx→CRy leg of the data replication facility as follows:

If RDF/A is not active with host intervention required on the R2 side, CPM 315 will clean up the configuration.

CPM 315 will wait for cleanup on the R1 and/or R2 side to complete.

If the devices are not active in RDF/A and are not in ADCOPY-DISK, CPM 315 will set ADCOPY-DISK mode for those devices.

If the devices are target not ready (TNR), CPM 315 will resume RDF for those devices.

CPM 315 will wait for any invalid tracks to sync up.

If RDF/A is not active, CPM 315 will activate RDF/A for the RDF groups.

If MSC 305 is not active, CPM 315 will activate MSC 305 for those RDF groups.

CPM 315 will wait for MSC 305 global consistency to be achieved.

CPM 315 will then cause a snapshot subsystem, referred to herein as Data Protection for z systems (SVCMS) 190, to begin the creation of consistent snapsets 330 at CRy at a regular pace, determined by the state of an airgap of the RDF links 250 or the specified snap interval or schedule, e.g., as provided by the user.

If the Cyber Protection Manager (CPM) application 315 finds that the MSC-based modality is not supported, in some embodiments the behavior is controlled by a CPM 315 option referred to herein as a "MAX_INVALIDS" threshold, which is a value that specifies a largest number of invalid tracks on the DCx→CRy leg of the data replication facility that are considered acceptable. If the MAX_INVALIDS threshold is specified as 0 (default), CPM 315 will perform no action on the DCx→CRy leg of the data replication facility, because it is not possible to meet the specified MAX_INVALIDS threshold. If the MAX_INVALIDS threshold is non-zero, and the DCx→CRy RDF links are online, the cyber protection automation system will operate in the data drain modality on the DCx→CRy leg of the data replication facility, and CPM 315 will take the following actions for the devices on the DCx→CRy leg of the data replication facility:

If the devices are not in ADCOPY-DISK, CPM 315 will set ADCOPY-DISK mode for those devices.

If devices are Target Not Ready (TNR), CPM 315 will resume remote data forwarding for those devices.

If the invalid tracks exceed the value of MAX_INVALIDS, CPM 315 will issue a warning message.

Figure 3:
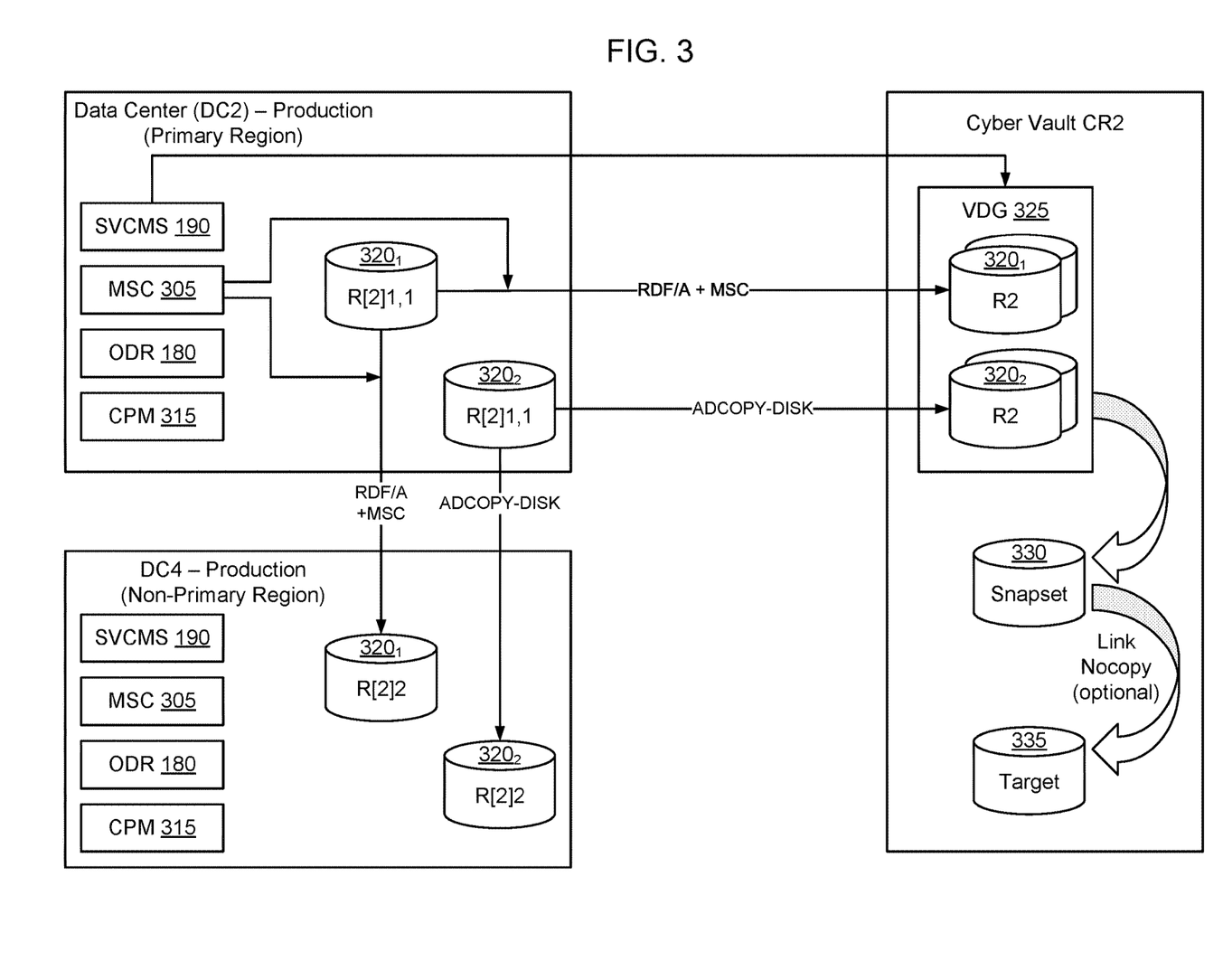
FIG. 3 is a block diagram of a portion of the storage environment of FIG. 2, showing replication of data from a source data center DC2 in a primary region to a data center DC4 in a non-primary region, and showing replication of data from the source data center DC2 in the primary region to a Cyber Vault CR2, according to some embodiments.

FIG. 3 is a block diagram of a portion of the storage environment of FIG. 2, showing replication of data from a source data center DC2 in a primary region to a data center DC4 in a non-primary region, and showing replication of data from the source data center DC2 in the primary region to a Cyber Vault CR2, according to some embodiments.

In particular, FIG. 3 shows a space-saving cyber protection automation implementation, in which Cyber Protection Manager (CPM) 315 is providing cyber protection for the data volumes $320_1$, $320_2$ in the primary region of a data replication facility configured using a square configuration using a single vault site (CR2). When DC2 is in the primary region, as shown in FIG. 3, the CPM operates in the MSC-based modality, ensuring that DC2→CR2 replication is active in RDF/A (Asynchronous remote data forwarding), and the MSC application 305 ensures that the data of the storage volumes in the cyber vault are globally consistent with the storage volumes 320 on the production data center DC2 at the time of creation of the snapsets on CR2. SVCMS 190 creates consistent snapsets at CR2 at a regular pace determined by the state of an airgap on links 250 or according to a specified snapshot creation interval or schedule.

Figure 4:
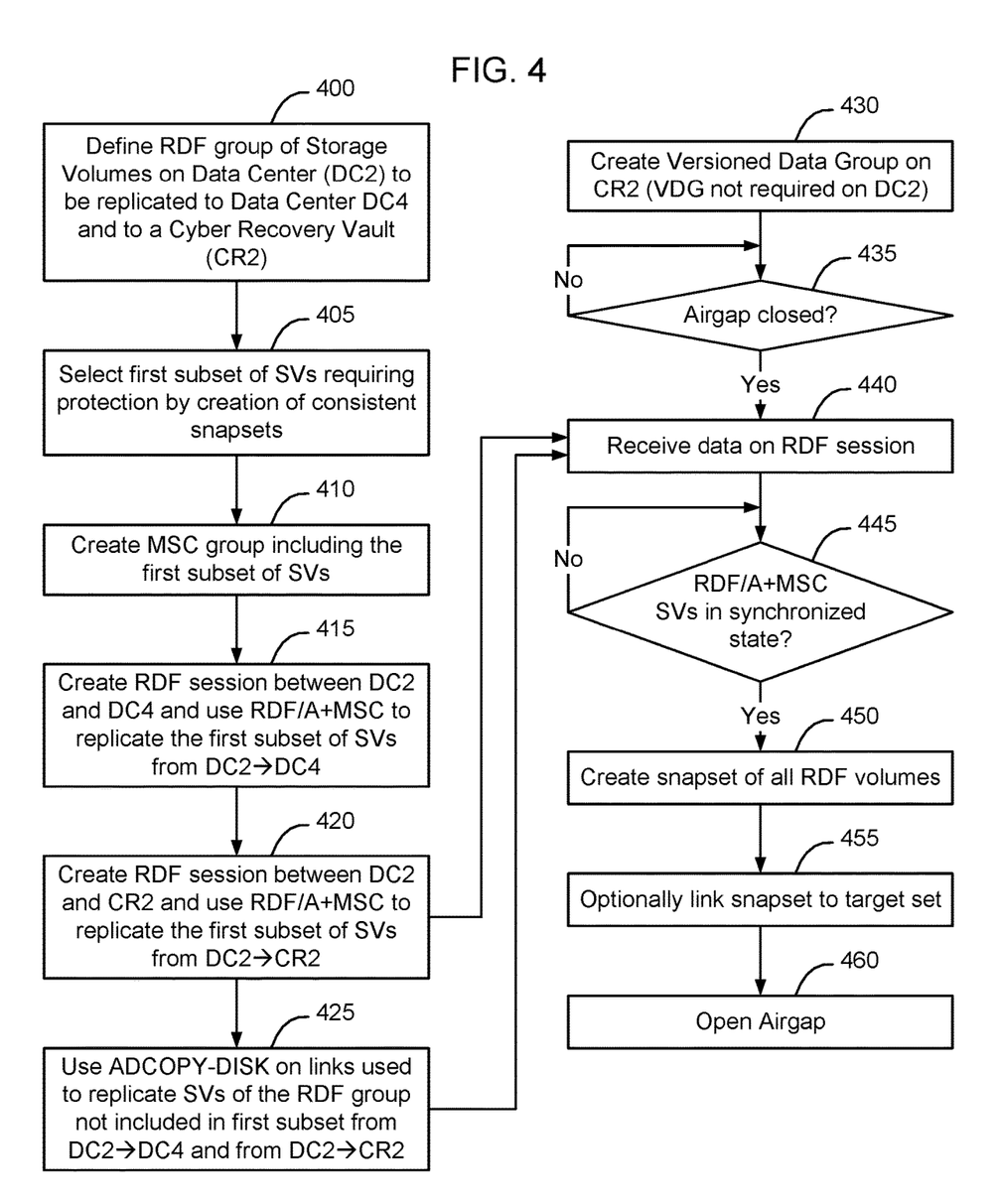
FIG. 4 is a flow chart corresponding to FIG. 3, and shows an example method of protecting a set of storage volumes in source data center DC2 by creation of snapshots of the storage volumes on the Cyber Vault CR2 without first creating corresponding snapshots on the source data center DC2, according to some embodiments.

FIG. 4 is a flow chart corresponding to FIG. 3, and shows an example method of protecting a set of storage volumes of source data center DC2 by creation of snapshots of the storage volumes on the Cyber Vault CR2 without first creating corresponding snapshots of the storage volumes on the source data center DC2, according to some embodiments.

As shown in FIG. 4, initially at the production site DC2 a Remote Data Forwarding (RDF) group is defined (block 400) to include a set of storage volumes that are to be replicated from the data center (DC2 in this example) to a cyber vault (CR2 in this example). As shown in FIG. 3, in some embodiments the RDF group includes a first set of volumes $320_1$ that are mirrored using RDF/A+MSC, and a second set of volumes $320_2$ that are mirrored to the cyber vault using ADCOPY-DISK. The first set of volumes $320_1$, in this example, need to be consistent with each other and, accordingly, are replicated using RDF/A+MSC, which ensures that the version of the storage volumes $320_1$ in the cyber vault CR2 is consistent with the version of the storage volumes $320_1$ on the production device DC2 (block 405). A second set of volumes $320_2$ of the RDF group do not need to be consistent, but the data needs to be replicated to the cyber vault CR2. To reduce the amount of stress on the RDF links, this second subset of storage volumes $320_2$ are replicated from the production site DC2 to the cyber vault CR2 using adaptive copy disk (ADCOPY-DISK). Since this second set of storage volumes $320_2$ is always replicated using adaptive copy disk, the flow chart in FIG. 3 focuses exclusively on the first set of volumes $320_1$, which need to be consistent between the production site DC2 and the cyber vault CR2.

As shown in FIG. 4, in some embodiments, the first subset of storage volumes $320_1$ requiring protection by creation of consistent snapsets is selected (block 405) and an MSC group including the first subset of storage volumes $320_1$ is created (block 410). An RDF session between DC2 and DC4 is created and RDF/A+MSC is used to replicate the first subset of storage volumes from DC2 to DC4 to create a consistent set of storage volumes at the production site DC4 in the non-primary region (block 415). A second RDF session between DC2 and CR2 is created and RDF/A+MSC is used to replicate the first subset of storage volumes $320_1$ from DC2 to CR2 to create a consistent set of storage volumes $320_1$ at the cyber vault CR4 (block 420). As noted above, adaptive copy disk is used to replicate storage volumes $320_2$ of the RDF group that are not included in the first subset of storage volumes $320_1$, both between the production sites (from DC2 to DC4) and from the production site to the cyber vault (from DC2 to CR2) (block 425).

At the cyber vault CR2, a Versioned Data Group (VDG) 325 is created (block 430). A versioned data group, as that term is used herein, is a construct used by the snapshot subsystem (SVCMS 190) to create snapsets. A versioned data group 325 has a number of storage volumes and, when the snapshot subsystem 190 creates a snapset 330, it will create a snapshot of each of the storage volumes 320 of the versioned data group 325 at the same time. Thus, the creation of a versioned data group 325 enables a snapshot of each storage volume 320 of the VDG 325 to be created at the same point in time, thus providing a consistent image of each storage volume 320 of the set of storage volumes of the VDG 325.

Periodically, at the cyber vault CR2, a determination is made as to whether a snapset should be created of the storage volumes 320 of the VDG 325 (block 435). For example, as shown in FIG. 4, a determination may be made as to whether the air gap has closed, which might be used as an indication that a snapset of the storage volumes should be created in the cyber vault CR2 (a determination of YES at block 435). Alternatively, other criteria might be used to trigger creation of a snapset, such as the passage of time or another triggering event.

When the air gap is closed, the cyber vault will receive data on the RDF session (block 440). The cyber vault will then wait for RDF/A+MSC to achieve synchronized state between the storage volumes of the production data center DC2 and the storage volumes of the cyber vault CR2 (block 445). While synchronized state is not achieved (a determination of NO at block 445), the cyber vault CR2 will wait and continue to receive data on the RDF session (block 440). Once synchronized state has been achieved (a determination of YES at block 445), a snapset of all of the storage volumes of the Versioned Data Group (VDG) 325 is created (block 450). Optionally, the storage volumes of the snapset may be linked to target devices (block 455) to make the storage volumes of the snapset available for use on the cyber vault CR2 (block 460). In embodiments where the cyber vault CR2 is equipped to implement an airgap, optionally the airgap may be opened (block 460) after synchronized state has been achieved (after a determination of YES at block 445). Although FIG. 4 shows the airgap as being opened after creation of the snapset, it should be noted that the airgap may be opened as soon as synchronization has been achieved and before creation of the snapset (before block 450).

Figure 5:
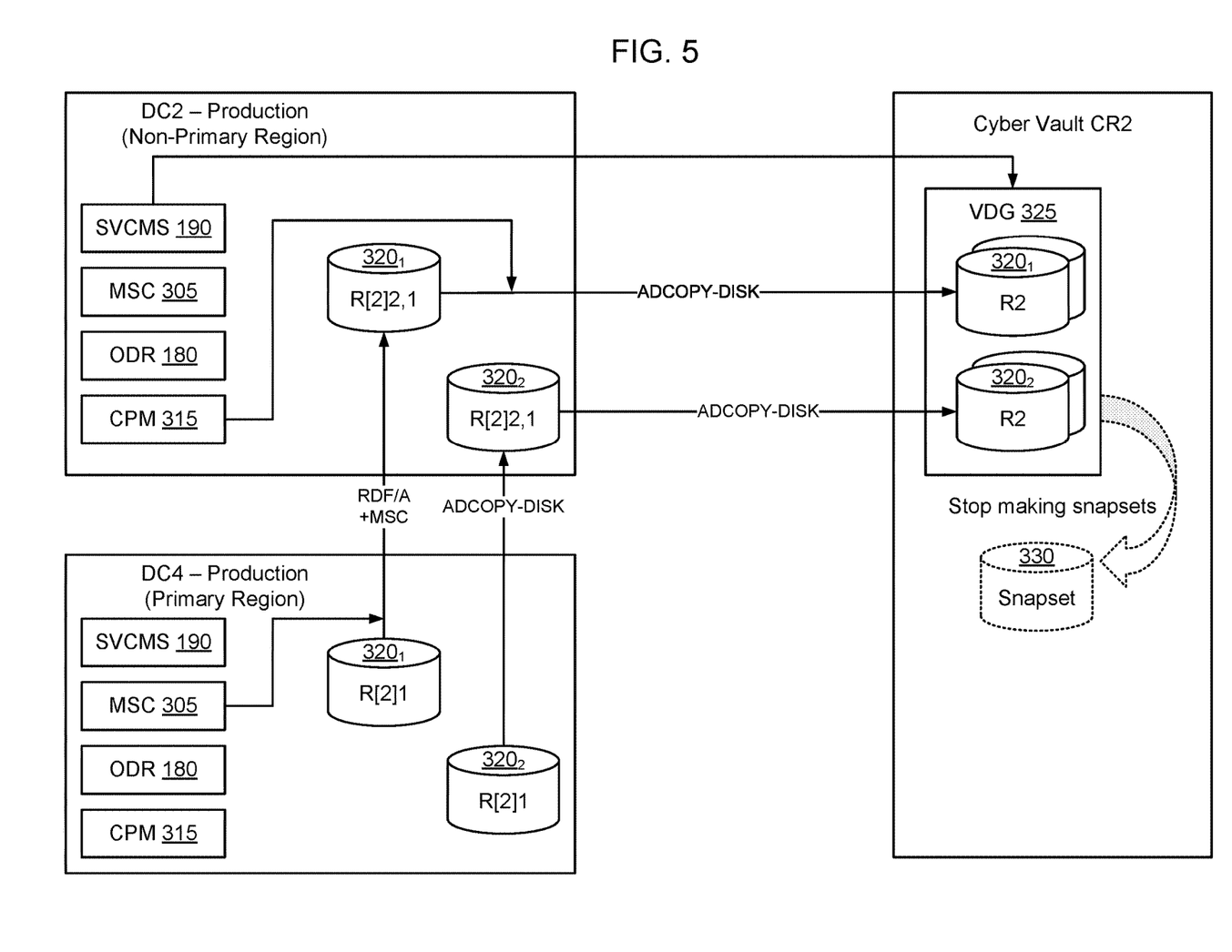
FIG. 5 is a block diagram of a portion of the storage environment of FIG. 2 after a region swap, showing replication of data from a source data center DC4 in the new primary region to a data center DC2 in the new non-primary region, and showing replication of data from the data center DC2 to a Cyber Vault CR2, according to some embodiments.

FIG. 5 is a block diagram of a portion of the storage environment of FIG. 2 after a region swap, showing replication of data from a source data center DC4 in the now primary region to a data center DC2 in the now non-primary region, and showing replication of data from the data center DC2 in the non-primary region to a Cyber Vault CR2, according to some embodiments. Specifically, FIG. 5 shows the same configuration as FIG. 3 after a region swap, illustrating the automatic adaptation of cyber protection automation behavior in response to the change in Orchestrated Disaster Recovery (ODR) 180 production configuration region roles. As shown in FIG. 5, cyber protection automation now provides limited cyber protection for the data in what has become a non-primary region in the ODR 180 production configuration. When DC2 is not in the primary region, cyber protection automation is limited to providing a data drain from DC2 to CR2 in ADCOPY-DISK mode with the goal of keeping the DC2→CR2 differential below the specified MAX_INVALIDS threshold value in order to allow for a faster restart of the MSC-based modality when DC2 is again in the primary region (after a subsequent region swap back to the configuration shown in FIG. 3). CPM 315 ensures that the DC2→CR2 leg is permanently draining data in ADCOPY-DISK mode (with respect for any airgap). It issues warning messages if the DC2→CR2 invalid tracks are greater than the specified MAX_INVALIDS threshold value or if the DC2→CR2 RDF links 250 go offline in a non-airgap implementation.

As shown in FIG. 5, after the ODR 180 region swap, production device DC4 is now in the primary region. Accordingly, the R1 device has shifted from DC2 to DC4, and DC4 now replicates data to DC2 using RDF/A+MSC to ensure that a consistent copy is created on DC2. In some embodiments, it is not possible to implement cascaded RDF/A to RDF/A mirroring. Accordingly, DC2 is not able to implement RDF/A+MSC on the RDF transmission links to the cyber vault CR2. Rather, DC2 uses ADCOPY-DISK to mirror data to the cyber vault CR2 to attempt to keep the number of invalid tracks on the cyber vault to below the MAX_INVALIDS threshold value. Since the storage volumes in the cyber vault CR2 are, accordingly, not guaranteed consistent (since MSC is not able to be used on the link between DC2 and CR2), snapshot creation is suspended on the cyber vault CR2 (as indicated using the dashed lines). In instances where DC2 is once again in the primary mode (a revert back to FIG. 3) the previous use of adaptive copy disk to minimize the number of invalid tracks on the cyber vault accelerates the process of achieving consistency between the production device DC2 and the cyber vault CR2.

Figure 6:
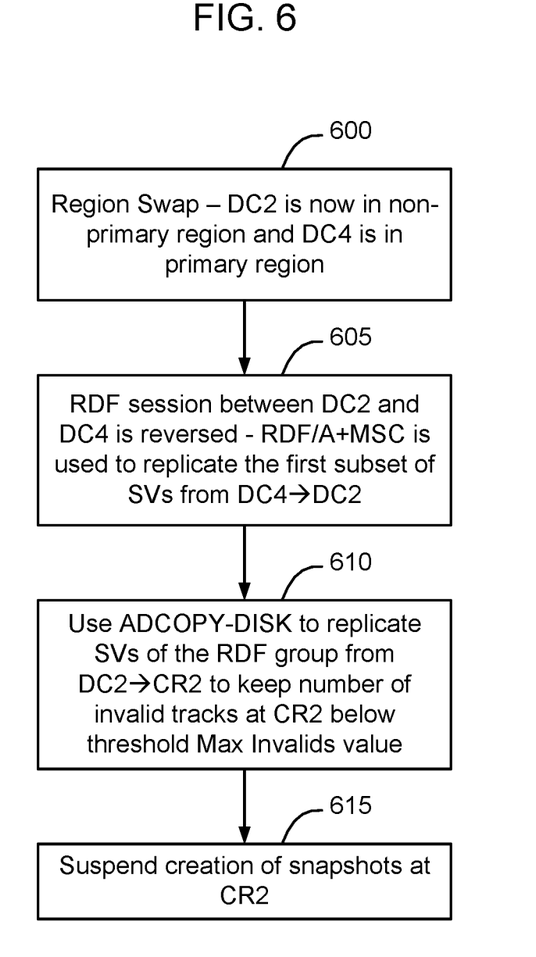
FIG. 6 is a flow chart corresponding to FIG. 5, and shows an example method of updating data in the cyber vault when the cyber vault CR2 is connected to a data center DC2 in the non-primary region that is not the source data center, according to some embodiments.

FIG. 6 is a flow chart corresponding to FIG. 5, and shows an example method of updating data in the cyber vault CR2 when the cyber vault CR2 is connected to a data center DC2 in the non-primary region that is not the source data center, according to some embodiments. As shown in FIG. 6, when a region swap occurs, and the data center DC2 is determined to be in the ODR 180 non-primary region and data center DC4 is in the primary region (block 600) the RDF session between DC2 and DC4 is reversed. Namely, DC4 becomes the source (R1 device) and DC2 becomes the target (R2 device) on the RDF session between the primary and non-primary regions. RDF/A+MSC is used on the DC4→DC2 RDF session to replicate the first subset of storage volumes from DC4 to DC2 (block 605). On the data replication facility between DC2 and CR2, DC2 continues to be the source (R1 device) and CR2 continues to be the target (R2 device). However, DC2 uses ADCOPY-DISK to replicate the first subset of the storage volumes of the RDF group from DC2 to CR2, to attempt to keep the number of invalid tracks at CR2 at or below the MAX_INVALIDS threshold value (block 610). On the cyber vault CR2, creation of snapshots is suspended (block 615) because consistency of the storage volumes is not guaranteed on the DC2→CR2 data replication facility.

Figure 7:
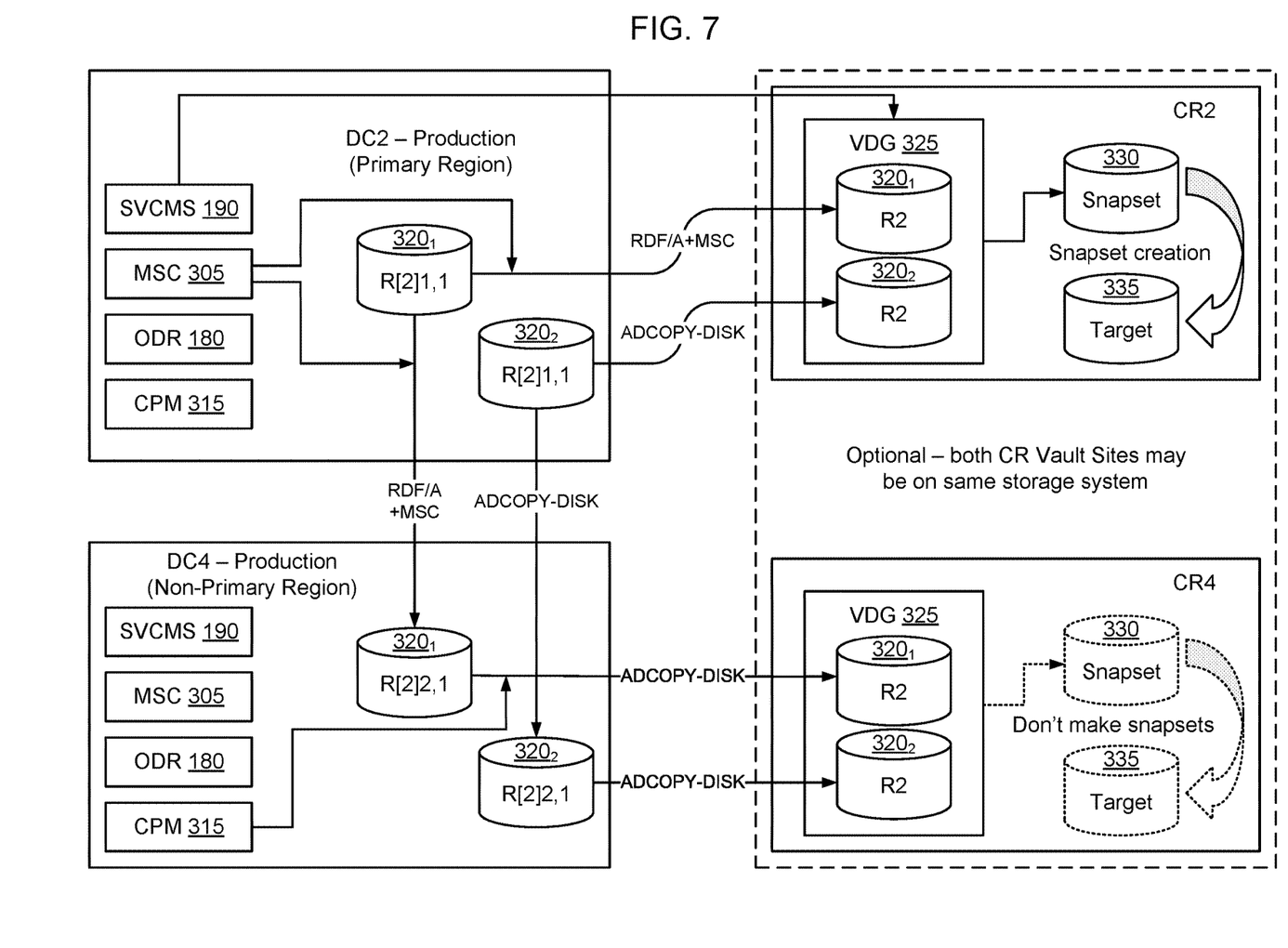
FIGS. 7 and 8 are block diagrams of a portion of the storage environment of FIG. 2, showing replication of data between two data centers DC2 and DC4, and corresponding cyber vaults CR2 and CR4, according to some embodiments.
Figure 8:
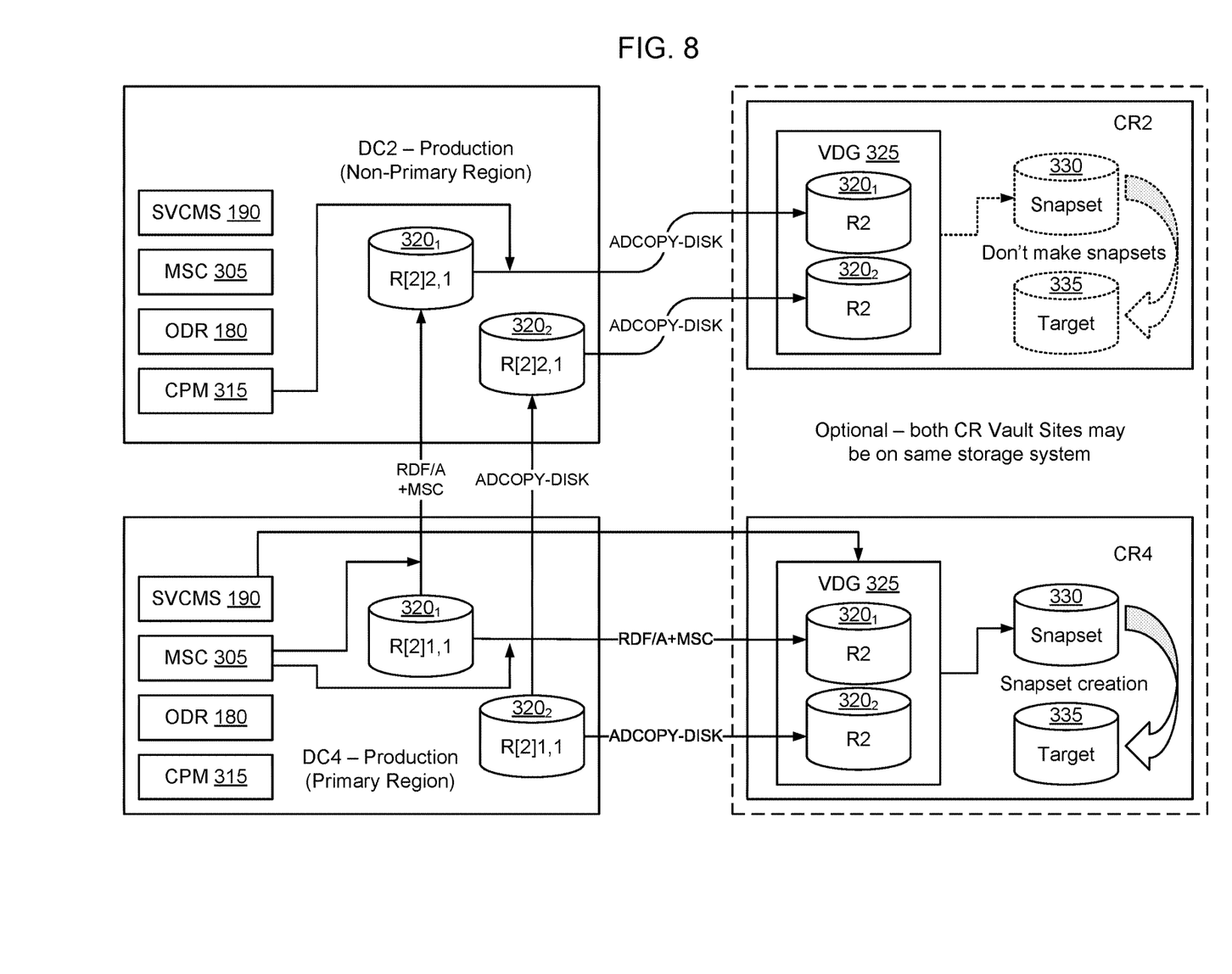

FIGS. 7 and 8 are block diagrams of a portion of the storage environment of FIG. 2, showing replication of data between two data centers DC2 and DC4, and corresponding cyber vaults CR2, CR4, according to some embodiments. In FIG. 7, data center DC2 is in the primary region and data center DC4 is in the non-primary region. FIG. 8 shows the same configuration as FIG. 7 after a region swap, in which data center DC4 is in the primary region and data center DC2 is in the non-primary region.

FIG. 7 shows a space-saving cyber protection automation implementation in a data replication facility using 2 vault sites (CR2 and CR4), which in this example are implemented using a single storage system. It is also possible for each vault site to have its own storage system or storage systems. The first vault site (CR2) provides cyber protection for the data in the primary region of the ODR 180 production configuration using the MSC-based modality, ensuring that DC2→CR2 replication is active in RDF/A and globally consistent at the time of CR2 snapset creation. CPM 315 causes SVCMS 190 to create consistent snapsets at CR2 at a regular pace, determined by the state of an airgap or based on a specified snapshot creation interval or schedule.

The second vault site (CR4) provides limited cyber protection for the data in the non-primary region of the same ODR 180 production configuration. In this non-primary region, cyber protection automation is limited to providing a data drain from DC4 to CR4 in ADCOPY-DISK mode with the goal of keeping the number of invalid tracks on the DC4→CR4 leg below the specified MAX_INVALIDS threshold value in order to allow for a faster restart of the MSC-based modality when DC4 is in the primary region. CPM 315 ensures that the DC4→CR4 leg is permanently draining data in ADCOPY-DISK mode (with respect for any airgap). CPM 315 issues warning messages if the number of DC4→CR4 invalid tracks are greater than the specified MAX_INVALIDS threshold value or if the DC4→CR4 RDF links go offline in a non-airgap implementation.

FIG. 8 shows the same configuration as FIG. 7 after a region swap, illustrating the automatic adaptation of cyber protection automation behavior of CPM 315 in response to the change in ODR 180 production configuration region roles. The primary region has now become a non-primary region and cyber protection automation is reduced to operating in the data drain modality from the DC2→CR2 RDF leg, whereas the non-primary region has become the primary region and cyber protection automation has augmented its operation on the DC4→CR4 RDF leg to the MSC-based modality. After achieving synchronization of the storage volumes between DC4 and CR4, CPM 315 causes the snapshot subsystem SVCMS 190 to create snapsets of the storage volumes 320 on the cyber vault CR4, thus enabling both cyber vaults to be alternately utilized to provide data protection on the data replication facility.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of automated orchestration of cyber protection for a set of storage volumes for storing data, comprising:
    defining a remote data forwarding group on a first production site, the remote data forwarding group including the set of storage volumes;
    creating a data replication facility including the first production site and a first cyber vault, the data replication facility using asynchronous remote data forwarding to mirror the set of storage volumes from the first production site to the first cyber vault;
    mirroring the set of storage volumes from the first production site to the first cyber vault;
    using a multi-site consistency application to achieve a consistent state of data on storage volumes at the first cyber vault; and
    in response to a determined consistent state of the data on the storage volumes at the first cyber vault, creating a snapset of the storage volumes in the first cyber vault without first creating a corresponding snapset of the set of storage volumes on the first production site.

2. The method of claim 1, wherein the data replication facility further includes a second production site, the data replication facility using asynchronous remote data forwarding to mirror the set of storage volumes from the first production site to the second production site.

3. The method of claim 2, wherein the first production site is in a primary region of the data replication facility and the second production site is in a non-primary region of the data replication facility.

4. The method of claim 3, further comprising performing a region swap, in which the first production site is in the non-primary region of the data replication facility and the second production site is in the primary region of the data replication facility.

5. The method of claim 4, further comprising, in response to the region swap, changing the data replication facility to use adaptive copy-disk remote data forwarding to mirror data of the set of storage volumes from the first production site to the first cyber vault.

6. The method of claim 2, wherein the data replication facility further includes a second cyber vault connected to the second production site, the data replication facility using adaptive copy-disk remote data forwarding to mirror a set of storage volumes from the second production site to the second cyber vault.

7. The method of claim 6, wherein the first production site is in a primary region of the data replication facility and the second production site is in a non-primary region of the data replication facility; and
    the method further comprising performing a region swap, in which the first production site is in the non-primary region of the data replication facility and the second production site is in the primary region of the data replication facility.

8. The method of claim 7, further comprising, in response to the region swap, changing the data replication facility to use adaptive copy-disk remote data forwarding to mirror data of the set of storage volumes from the first production site to the first cyber vault, and to use asynchronous remote data forwarding to mirror data of the set of storage volumes from the second production site to the second cyber vault.

9. The method of claim 8, further comprising using the multi-site consistency application to achieve a consistent state of data on the set of storage volumes at the second cyber vault; and in response to a determined consistent state of the data on the set of storage volumes at the second cyber vault, creating a snapset of the set of storage volumes in the second cyber vault without first creating a corresponding snapset of the set of storage volumes on the second production site.

10. The method of claim 1, further comprising defining a versioned data group at the first cyber vault, the versioned data group including the set of storage volumes at the first cyber vault.

11. A system for automated orchestration of cyber protection for a set of storage volumes for storing data, comprising:

one or more processors and one or more storage devices storing instructions that are operable, when executed by the one or more processors, to cause the one or more processors to perform operations comprising:

defining a remote data forwarding group on a first production site, the remote data forwarding group including the set of storage volumes;

creating a data replication facility including the first production site and a first cyber vault, the data replication facility using asynchronous remote data forwarding to mirror the set of storage volumes from the first production site to the first cyber vault;

mirroring the set of storage volumes from the first production site to the first cyber vault;

using a multi-site consistency application to achieve a consistent state of data on storage volumes at the first cyber vault; and in response to a determined consistent state of the data on the storage volumes at the first cyber vault, creating a snapset of the storage volumes in the first cyber vault without first creating a corresponding snapset of the set of storage volumes on the first production site.

12. The system of claim 11, wherein the data replication facility further includes a second production site, the data replication facility using asynchronous remote data forwarding to mirror the set of storage volumes from the first production site to the second production site.

13. The system of claim 12, wherein the first production site is in a primary region of the data replication facility and the second production site is in a non-primary region of the data replication facility.

14. The system of claim 13, further comprising performing a region swap, in which the first production site is in the non-primary region of the data replication facility and the second production site is in the primary region of the data replication facility.

15. The system of claim 14, further comprising, in response to the region swap, changing the data replication facility to use adaptive copy-disk remote data forwarding to mirror data of the set of storage volumes from the first production site to the first cyber vault.

16. The system of claim 12, wherein the data replication facility further includes a second cyber vault connected to the second production site, the data replication facility using adaptive copy-disk remote data forwarding to mirror a set of storage volumes from the second production site to the second cyber vault.

17. The system of claim 16, wherein the first production site is in a primary region of the data replication facility and the second production site is in a non-primary region of the data replication facility; and the method further comprising performing a region swap, in which the first production site is in the non-primary region of the data replication facility and the second production site is in the primary region of the data replication facility.

18. The system of claim 17, further comprising, in response to the region swap, changing the data replication facility to use adaptive copy-disk remote data forwarding to mirror data of the set of storage volumes from the first production site to the first cyber vault, and to use asynchronous remote data forwarding to mirror data of the set of storage volumes from the second production site to the second cyber vault.

19. The system of claim 18, further comprising using the multi-site consistency application to achieve a consistent state of data on the set of storage volumes at the second cyber vault; and in response to a determined consistent state of the data on the set of storage volumes at the second cyber vault, creating a snapset of the set of storage volumes in the second cyber vault without first creating a corresponding snapset of the set of storage volumes on the second production site.

20. The system of claim 11, further comprising defining a versioned data group at the first cyber vault, the versioned data group including the set of storage volumes at the first cyber vault.

* * * * *